Sept. 1, 1942.　　A. A. GILLESPIE ET AL　　2,294,597
BACKGROUND PROJECTOR
Filed May 22, 1939　　7 Sheets-Sheet 1

INVENTORS
Albert Arnold Gillespie
Fred Hauser
BY Anthony G. Wise
Lyon & Lyon　ATTORNEYS

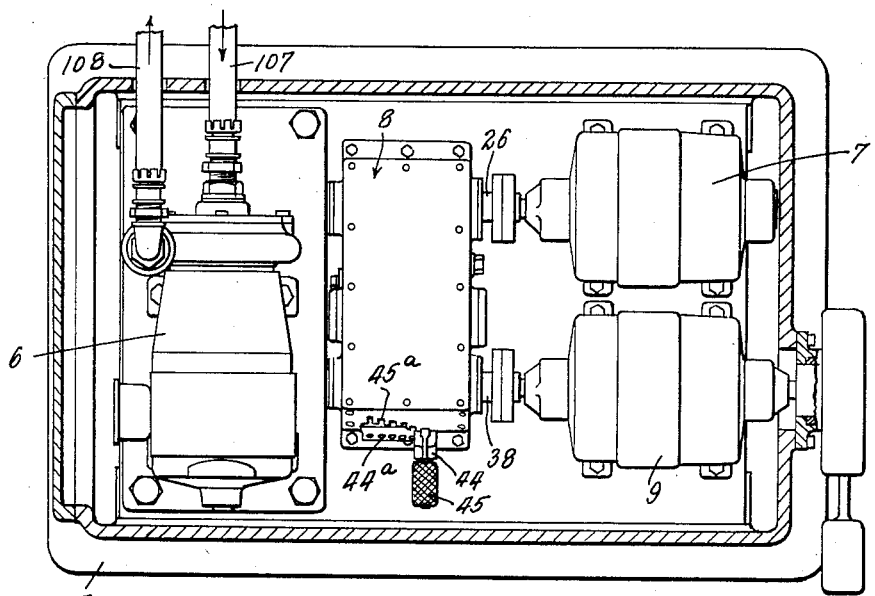
Fig. 2.
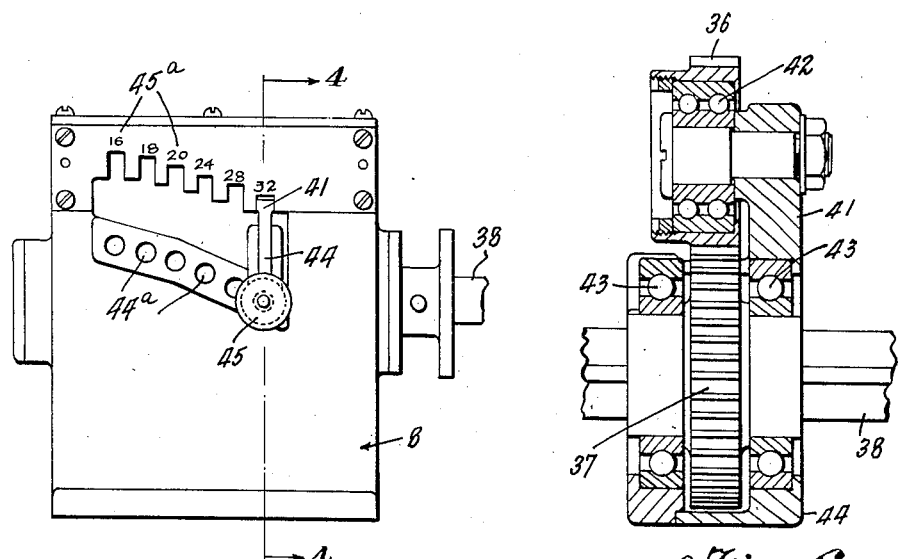
Fig. 3.
Fig. 6.

Sept. 1, 1942.  A. A. GILLESPIE ET AL  2,294,597
BACKGROUND PROJECTOR
Filed May 22, 1939  7 Sheets-Sheet 4

INVENTORS
Albert Arnold Gillespie
Fred Hauser
Anthony G. Wise
BY Lyon & Lyon ATTORNEYS

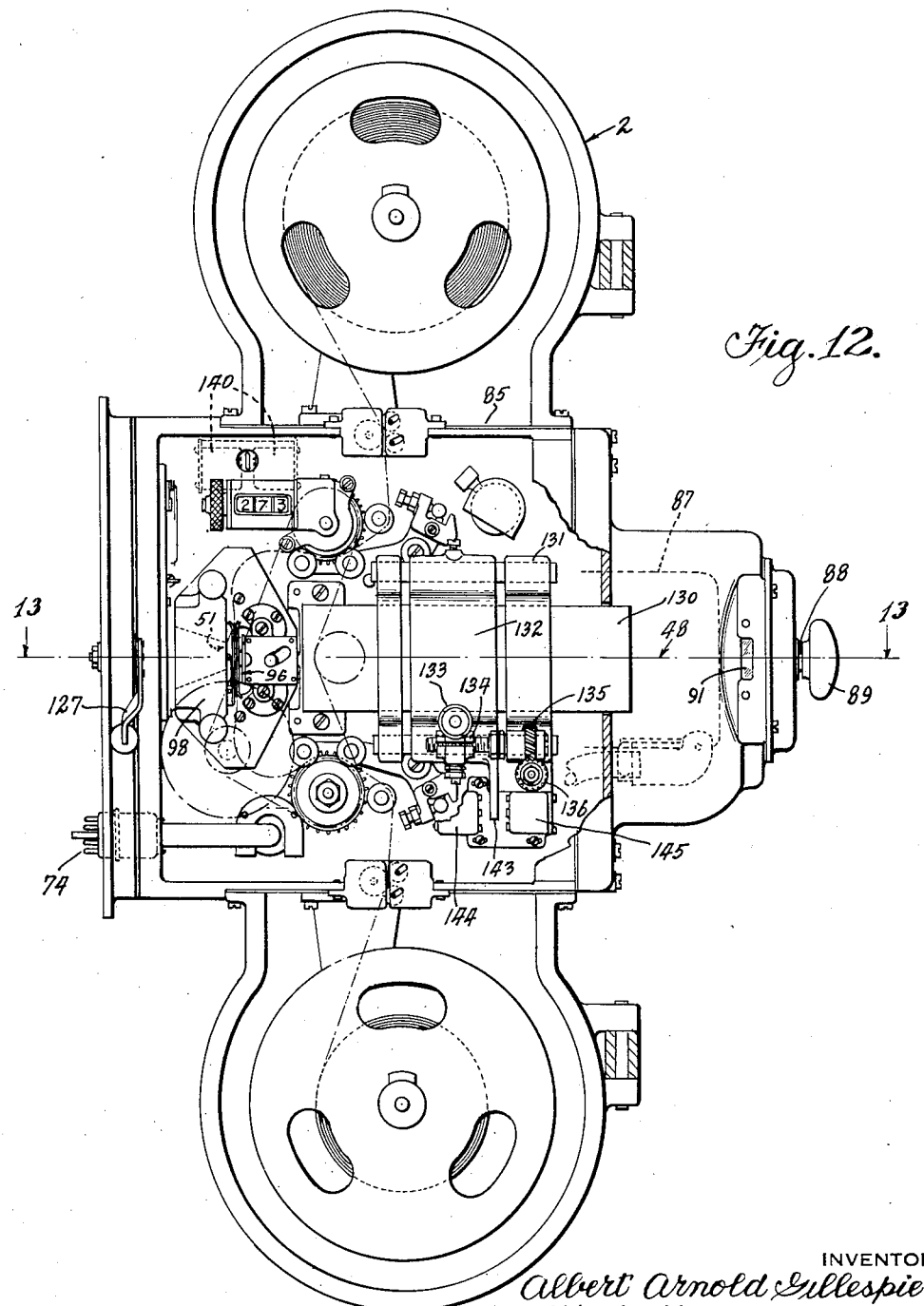

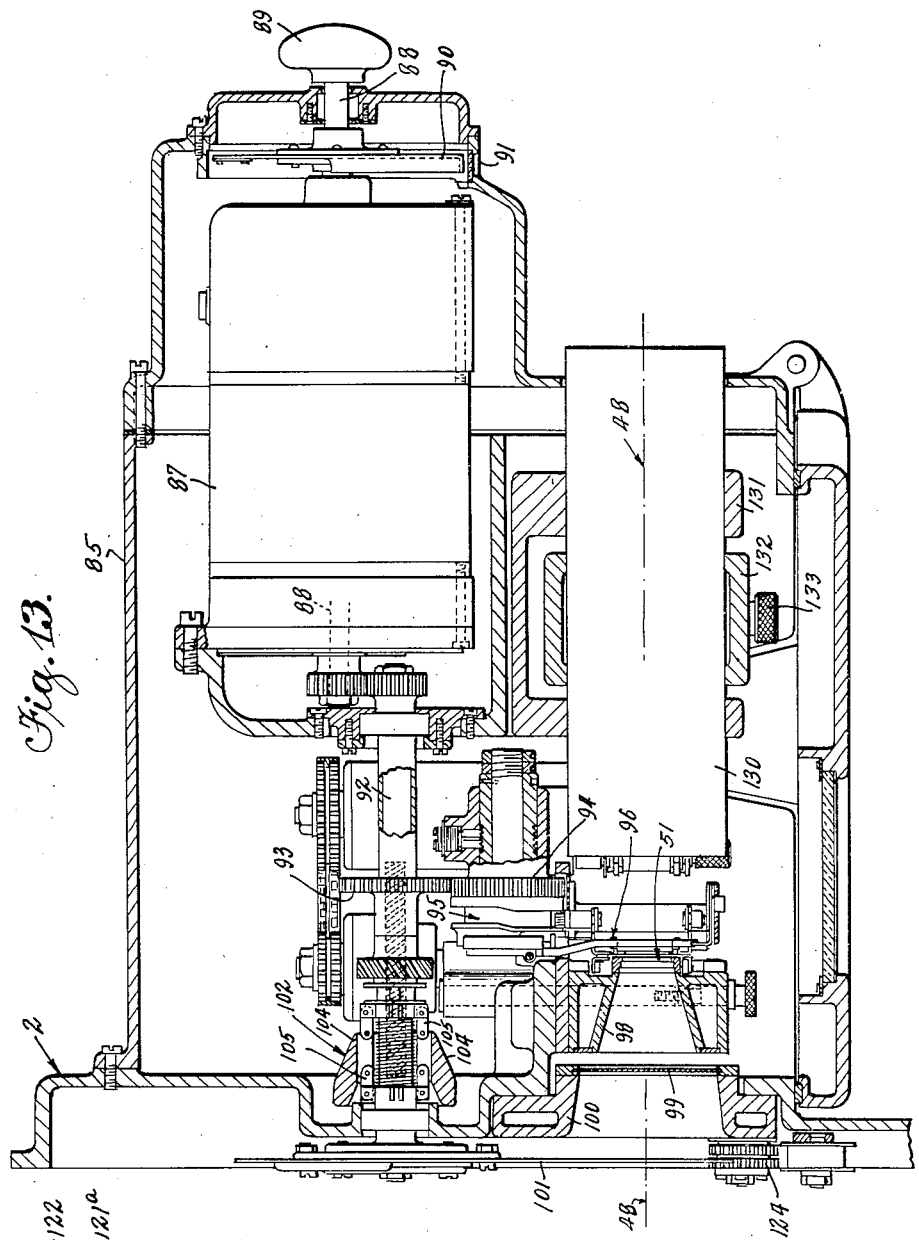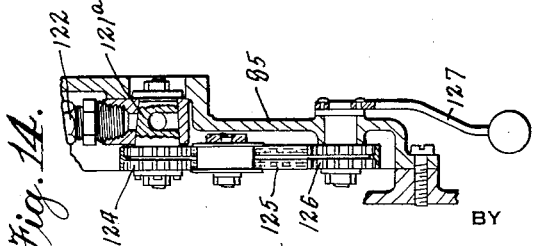

Patented Sept. 1, 1942

2,294,597

UNITED STATES PATENT OFFICE 2,294,597

BACKGROUND PROJECTOR

Albert Arnold Gillespie, West Los Angeles, Fred Hauser, Culver City, and Anthony G. Wise, Los Angeles, Calif., assignors to Loew's Incorporated, a corporation of Delaware Application May 22, 1939, Serial No. 274,910

4 Claims. (Cl. 88—17)

This invention relates to an apparatus for projecting moving pictures on a screen to serve as a background for action operating in front of the background, which action is to be photographed by a camera synchronized with the background projector.

In the production of moving pictures it is frequently desirable to use as a background of the action photographed a screen upon which is projected a moving picture. The picture so projected on the screen must be synchronized with the operation of any camera utilized in photographing the action. Furthermore, various desired speeds of projection are required at different times. It is likewise essential that the focusing of the background on the screen should be easily and properly controlled by the photographer.

It is a general object of the present invention to provide an apparatus for projecting moving pictures on the screen in such a manner that the projected scene is adapted for use as a background of the action to be photographed by a camera in front of such projected scene.

It is a further object of the present invention to provide a background projector of this type which incorporates various desirable control features important for the successful utilization of such a projector.

One object of the present invention is to provide a background projector in which all of the essential operating and control mechanisms are incorporated either in the projector or the base mounting therefor, so that the same constitutes a self-sufficient unit capable of being readily transported and removed from any desired place of use.

A further object of the present invention is to provide a background projector of the type described, in which the projecting head is provided with a universal mounting with respect to its base whereby the projections may be made in any desired angle, and further to include in the projector means by which the scene to be projected may be rotated so as to provide a revolving scene back of the action to be photographed.

A further object of the present invention is to provide a speed change means for the distributor of the film movement mechanism of such projector, which is so designed as to permit ready changes in the number of pictures or frames per second which will be projected by the projector, and to associate with such speed change mechanism simple form of control and indicating devices by which, through simple shifting of the lever, a desired speed of picture projection may be set and indicated by the apparatus.

Various further objects of the present invention, together with additional advantages of the present invention, will best be understood from a description of a preferred form or example of a background projector embodying the invention, and for this purpose there is hereafter described with reference to the accompanying drawings such a preferred form or example of the invention.

In the drawings:

Figure 2 is a plan view of the base with the base housing in section.

Figure 3 is an end elevation of the distributors of the speed changing mechanism for connecting the motor and distributor for regulating the interlocking motor.

Figure 6 is a fragmentary section on the line 6—6 of Figure 4 through the idler and lever gear.

Figure 12 is a section through the projector head.

Figure 13 is a horizontal section on the line 13—13 of Figure 12 through the projector head with the cooling water shut-off means being broken away.

Figure 14 is a fragmentary section of the cooling water shut-off means broken away from Figure 13.

Figure 1:
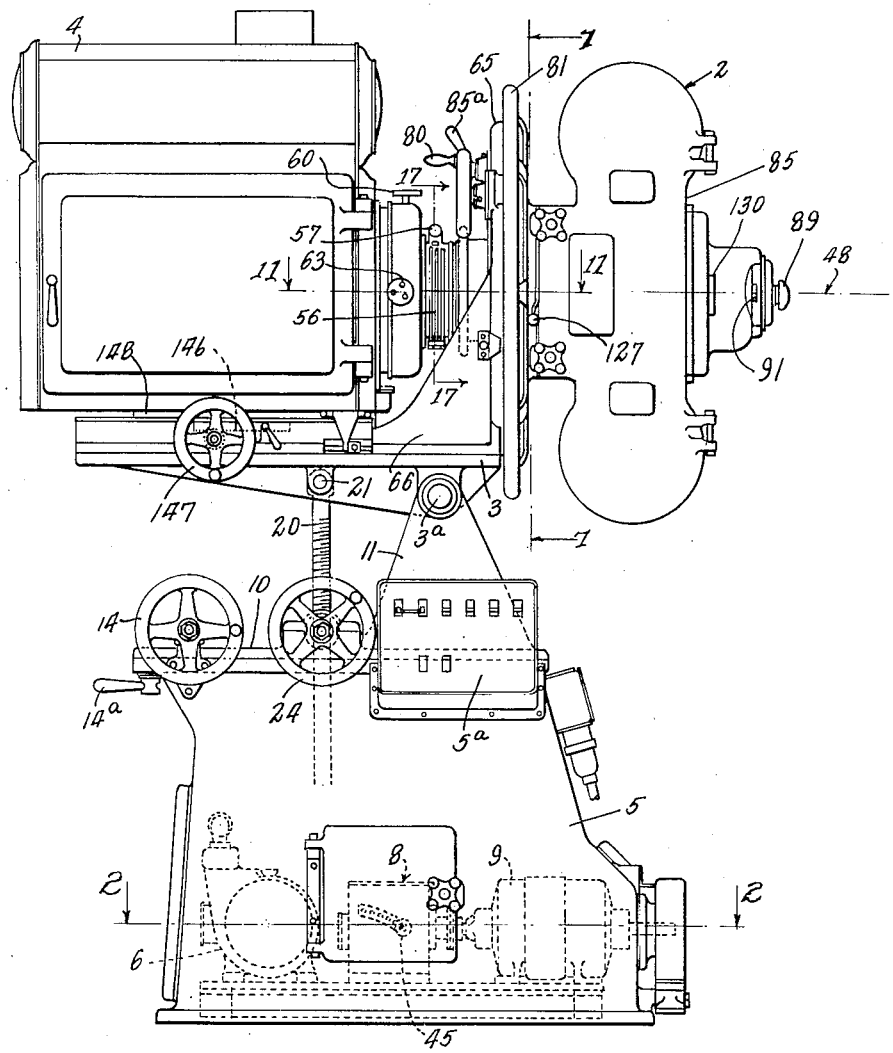
Figure 1 is a side elevation of the back-ground projector.
Figure 4:
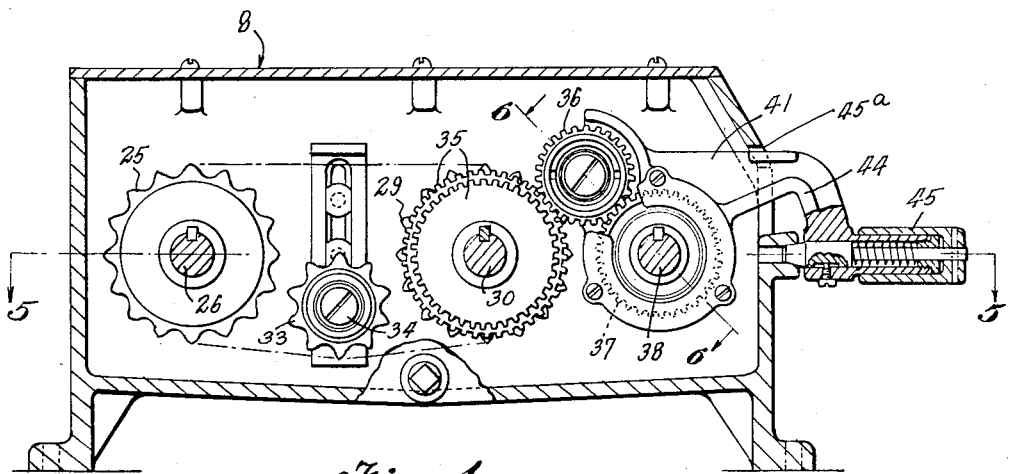
Figure 4 is a vertical section on the line 4—4 of Figure 3.
Figure 5:
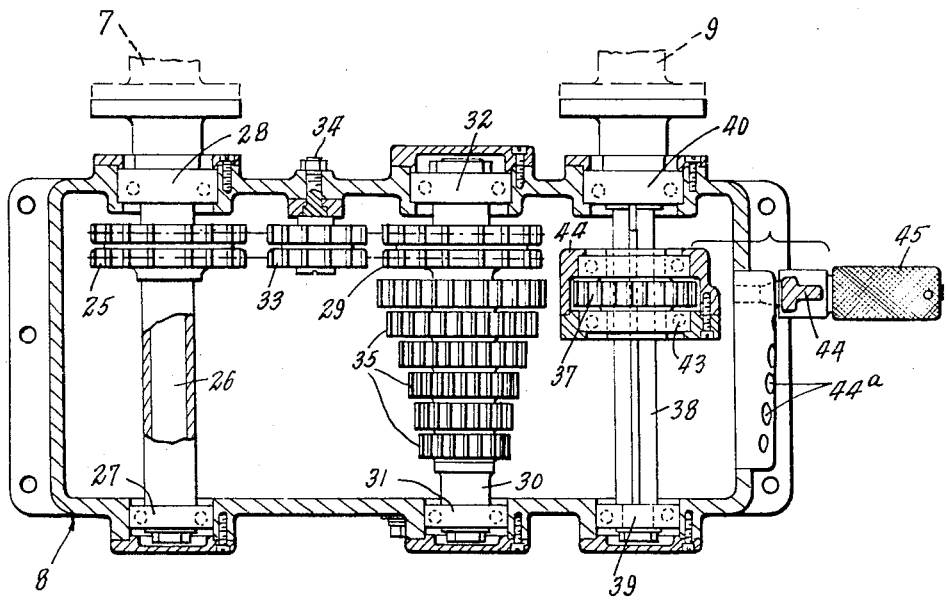
Figure 5 is a plan section on the line 5—5 of Figure 4.

Referring to the drawings, the background projector includes a projector head 2, which houses and includes aperture film moving mechanism and associated elements. The projector head 2 is mounted by a projector frame 3, which also supports a lantern housing 4. The lantern housing 4 may be of any usual or preferred construction, the details of which are not illustrated, and serves simply to provide a source of light for the apparatus. The projector frame 3 is pivoted as indicated at 3ᵃ to brackets mounted upon the top section of a panning base 10, which in turn is mounted on a base 5, which is so formed as to constitute a housing for certain of the essential driving and controlling apparatus of the projector, as well as a base for mounting certain indicating elements and control levers of the apparatus. Thus, the base 5 serves as a housing for pump 6 of the water-cooling system, for a motor 7 which drives certain speed control mechanism 8, for a distributor 9 which in turn controls the speed of the motors (located in the head 2 as hereinafter described) which control film and aperture moving mechanism. The base 5 also supports a certain switch and lever panel 5ᵃ, the purpose of which is hereinafter described.

The projector frame 3 is universally mounted with respect to the base 5, so that the scenes to be projected may be projected at any desired angle. For this purpose, the upper plate of the panning base 10 supports the brackets 11 upon which the projector frame 3 is pivotally mounted. The upper plate of the panning base 10 is movable about the axis by hand wheel 14. The upper plate of the panning base may be locked to the base in any suitable adjusted position by a lock lever 14a. For controlling the projector frame 3 about a horizontal axis the panning base 10 supports an elevating screw 20 pivoted as indicated at 21 in the projector base 3. An operating wheel 24 is shown for the elevating screw 20.

Now, referring more particularly to Figures 2 to 6, inclusive, the projecting apparatus incorporates means for controlling the speed of the distributor driving the projector and camera moving motors whereby the apparatus is capable of being operated at any one of a plurality of predetermined shutter speeds. For example, a common shutter speed is 24 frames per second, although shutter speeds of 16, 18, 20, 24, 28, and 32 frames per minute are desirable under different circumstances. The speed of the motor driving the film and shutter movement of the projector is controlled in the usual manner by current supply from a distributor 9. Distributor 9 is employed because the frequencies of the alternating current supply are normally unsuited for the speed of the film-moving motor. Accordingly, the alternating current is supplied to the motor 7, which is connected to drive the distributor 9, which in turn is connected to the synchronous motors of the film-moving mechanisms in the projector and camera, in the well-known manner. The speed of the motor of the film-moving mechanism will then depend upon the gear ratio between the motor 7 and distributor 9. In the past, it has been common practice to provide a fixed gearing between the motor and distributor, which compelled the projection machine to operate at one speed only. In the background projector of the present invention there is provided a gear shifting mechanism 8 interconnecting said motor 7 and distributor 9 so constructed as to be adapted to provide a ready means for changing the gear ratio between the motor 7 and distributor 9 so as to produce a plurality of desired standard shutter speeds. Associated with such gear shifting mechanism is an operating and indicating means for indicating the resulting shutter speed to be effected by any specific adjustment.

To accomplish such purposes, the motor 7 is indicated as driving the sprocket 25 (Figure 5) mounted on shaft 26 journaled as indicated at 27 and 28 in the gear shift housing 8. The sprocket 25 is indicated as provided with a chain drive to a sprocket 29, which is mounted upon a shaft 30 journaled in the gear shift housing, as indicated at 31 and 32. Preferably, there is provided a chain tightening sprocket 33 mounted upon a pin 34 vertically adjustable in a vertical slot in the gear shift housing 8. Shaft 30 is provided with a plurality of gears 35 of different desired sizes selected so that in connection with the sizes of the cooperating idler gear 36 and drive gear 37 the desired standard speed ratios may be established. The drive gear 37 and idler gear 36 are keyed to a drive shaft 38 journaled in bearings 39 and 40 of the gear housing 8, which drive shaft 38 is connected to the shaft of the distributor 9. The idler gear 36 is mounted on the arm 41 by bearings 42, and the arm 41 in turn is rotatably mounted on gear 37 through bearings 43 (Figure 6). The arm 41 mounting the idler gear 36 is connected to a setting lever 44 which extends through the gear box housing 8 and is there provided with a spring-actuated latch 45 adapted to be set in any one of a plurality of openings 44ᵃ, so that in any one of the set positions of the latch 45 the idler gear 36 will be engaged with one of the gears 35 within the gear shift housing. Preferably, suitable indicia 45ᵃ of the resulting shutter speed, which will be established by the different positions of the spring-actuated latch 45, are placed upon the gear shift housing 8, as indicated (see Figure 3).

Figure 11:
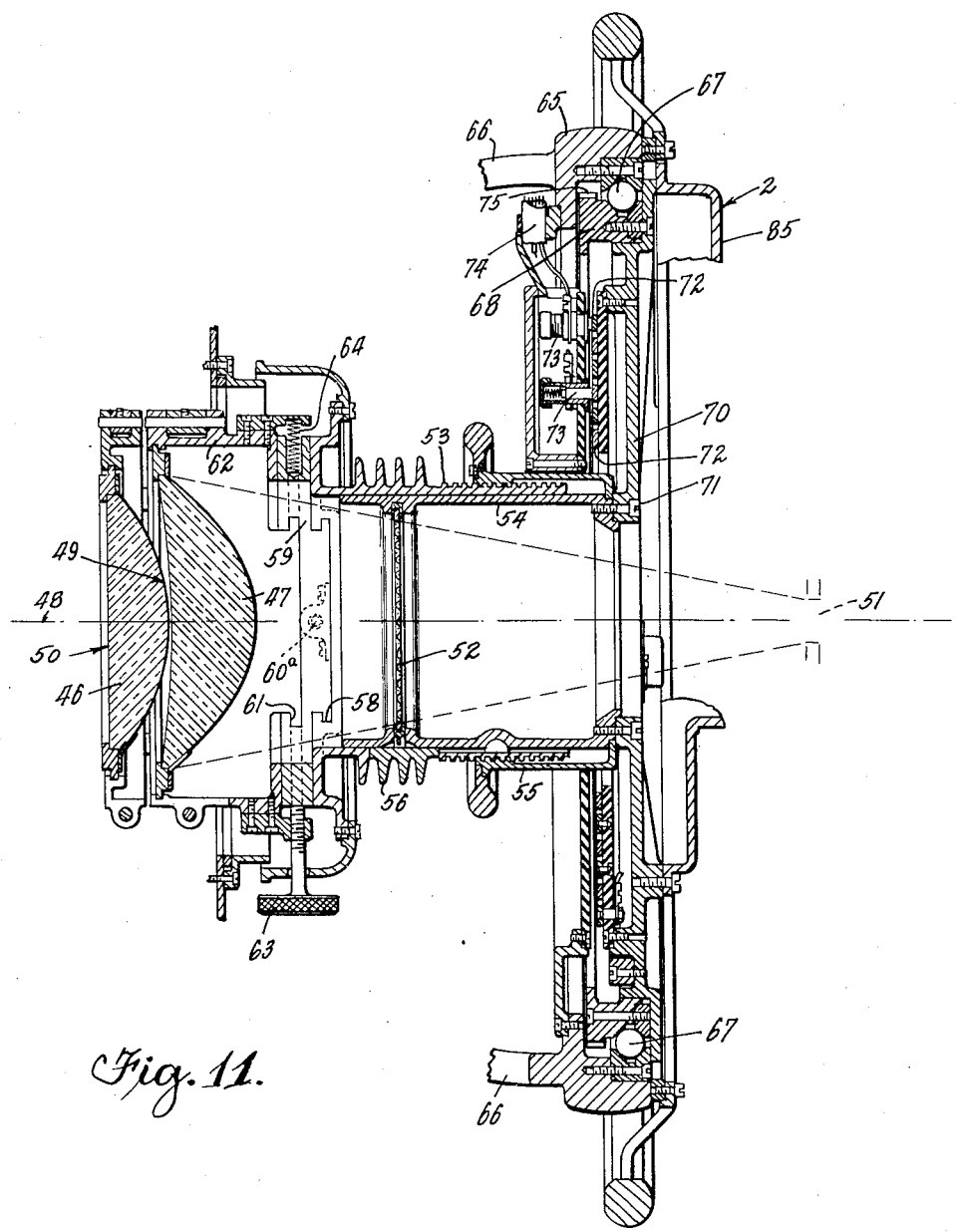
Figure 11 is a plan section on the line 11—11 of Figure 1 through the condenser lens assembly and rotary head.

Now, referring more particularly to Figure 11, the projector head 2 is preferably provided with the system of condenser lenses 46 and 47 for properly focusing the light from the lantern housing 4 on the aperture 51 of the projector. While various forms and types of condenser lens may be employed, the system of lenses preferably includes a lens, such as indicated at 47, which has its surfaces formed with their focus located on the optical axis 48 of the projector head 2; that is, each of the surfaces of the lens 47 may be considered as formed by revolving the lens shown in section in Figure 11 about the axis 48, one of the surfaces being convex and the other concave, as indicated. Such a lens used by itself or in connection with other similar lenses tends to concentrate the light in a central hot spot, and for projection purposes it is generally desirable to spread the light as more nearly into the form of a rectangle. For this purpose, the condenser lens includes also a lens of the type indicated at 46, which, although having one surface, such as its surface 49, with its focus on the axis 48, is provided with a further surface 50 of cylindrical form, or so shaped as to have the focus along the line intersecting the focal axis 48 of the system. By the composition of the lenses 46 and 47 the light from the lantern housing 4 of the projector (usually some form of carbon arc) may be condensed about the aperture 51 across which the frames of the film are to be passed in the form of an oval or approximate rectangle.

In order to properly adjust the light intensity applied on the aperture 51 independently of the current supply to the source of light within the lantern housing 4, there is provided a partially masking screen 52 formed of a suitable mesh material, the size of the openings and wire in the masking screen 52 determining the extent of the masking effect. By the insertion between the condenser lenses 46 and 47 and the aperture 51 of such masking screen 52 the desired light intensity at the aperture 51 can be properly regulated without disturbing the action of the light source within the lantern housing 4. It is to be understood that various designs of masking screens may be substituted for the screen 52 as requirements for different light intensity are encountered, and for this purpose the masking screen 52 is indicated as supported within a barrel sleeve 54, which is provided with hinged gate 56 adjacent the masking screen 52, which may be readily opened for replacement or substitution of different masking screens, as desired.

The lenses 46 and 47 are supported by a lens barrel 53 telescoped over the sleeve 54, and the position of the condensing lenses 46 and 47 with reference to the aperture 51 may be adjusted by telescopic movement between barrel 53 and sleeve 54. To control and adjust such movement the barrel 53 is screw-threaded to a socket 55 rotatable for axially moving the lenses 46 and 47 with reference to the aperture 51. Barrel 53 after being adjusted is locked to sleeve 54 with locking screw 57.

Figure 9:
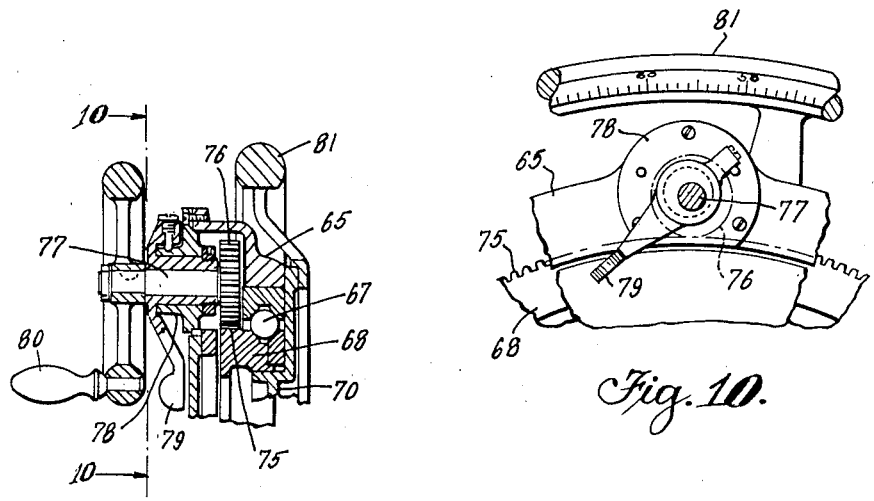
Figure 9 is a section on the line 9—9 of Figure 7 through a micrometer adjusting device.
Figure 10:
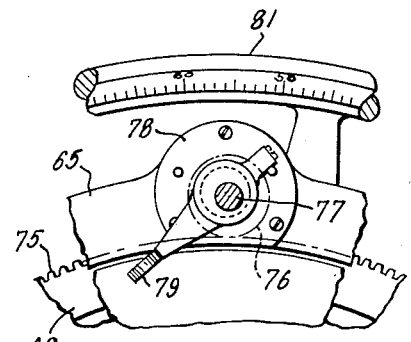
Figure 10 is a fragmentary plane view of the micrometer adjusting means and a portion of the rotary head taken on the line 10—10 of Figure 9.

The projector head 2 which contains and supports the lens system, as well as the film shutter moving mechanism, is rotatably mounted upon the projector frame 3 by means of a ring 65 (see Figures 1 and 11) supported by brackets 66 on the projector frame 3. The ring 65 mounts roller bearings 67, which in turn engage an inner ring 68 to which the projector head 2 is attached. The projector head 2 includes the plate 70, which, as indicated at 71, is attached to the sleeve 54 and is provided with a separate aperture to permit the passage of light from the lens system to the aperture 51. The plate 70 supports a plurality of rings 72 which are engaged by spring-actuated electrical contact brushes 73, which are connected to leads 74, by which current from the distributor 9 may be brought to the projector head to be passed to the motors driving the film and shutter mechanism. The ring 68 is further provided with gear teeth 75 which connect with pinion 76 (Figure 9), which pinion is mounted on a shaft 77 eccentric in a bushing 78, which bushing 78 is provided with a lever 79, by which the same way be rotated to engage or disengage pinion 76 from teeth 75. Shaft 77 is connected with a handwheel 80, which may be employed for rotating the projector head with reference to the projector frame 3 whenever a slow adjustment or accurate adjustment of the position of the projector head 2 with reference to the frame is desired. When it is desired to more rapidly rotate the projector head of the apparatus, such, for example, as when it is desired to provide an appearance of a rotating background back of the actors to be photographed, the pinion 76 may be disengaged from the gear teeth 75 and the projector head then rapidly revolved by means of a wheel 81 attached to the head 2, as indicated in Figure 11.

Figure 7:
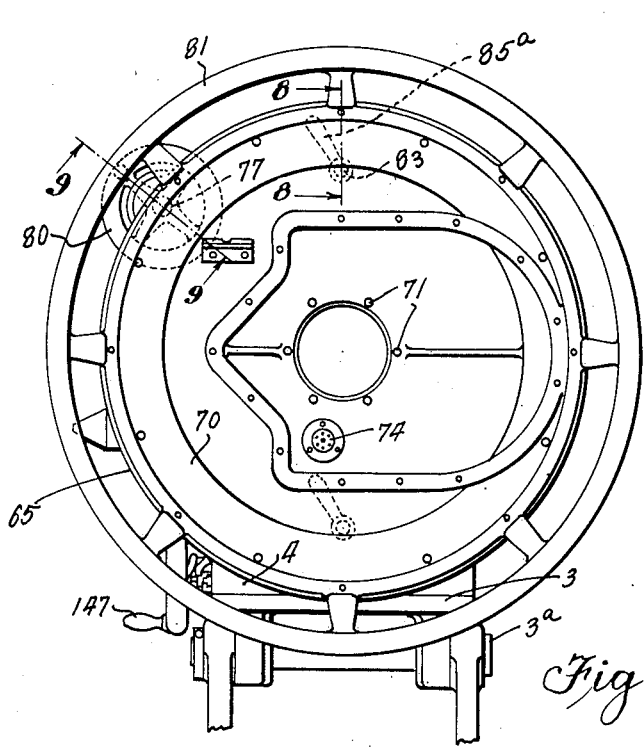
Figure 7 is a section on the line 7—7 of Figure 1 of the rotary head for the projector.
Figure 8:
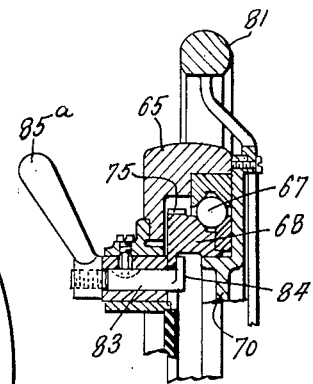
Figure 8 is a fragmentary section on the line 8—8 of Figure 7 through one of the head locking screws.

Means are further provided by which the position of the projector head with reference to the frame 3 may be locked in any desired position. For this purpose, as indicated in Figure 8, the ring 65 of the projector frame 3 is indicated as provided with lock means 83, any number of which may be provided around the ring (two thereof being indicated in Figure 7), which lock member includes a jaw 84 axially movable by handle 85ª into position to clamp or release the ring 65 of the projector head 2.

As indicated more particularly in Figures 12 and 13, the projector head 2 includes a soundproof housing 85 mounting a motor 87 for driving the film and shutter mechanism, the motor 87 being electrically connected to the contact rings 72 (see Figure 11) in any usual or desired manner. The motor 87 is provided with a shaft 88 which extends through the housing 85 and is there provided with a knob 89 for manually adjusting the position of the shutter and film-moving mechanism. Since the shutter movement of the projector is essentially hidden from view, and since it becomes frequently necessary to determine the position of the shutter of the projector for the purpose of aligning and synchronizing the same with the position of the shutter of the camera which may be employed in photographing action taking place in front of the scene formed by the projector, means are provided in the projector for indicating the position of such shutter and shutter moving mechanism. For this purpose, the shaft 88 of the motor 87 is provided with a disc 90 having a flange nut to indicate the position of the shutter and the housing 85 is provided with a window 91 by which the disc 90 may be viewed. Thus, the disc 90 constitutes what may be denominated a dummy shutter, and by observation of the position of the same the position of the actual shutter of the mechanism with reference to the aperture 51 may be determined.

The motor shaft 88 is indicated as geared to a stub shaft 92 having a gear 93 actuating the gear 94 of any suitable or desired film and shutter moving mechanism. Thus, the gear 94 is indicated as driving a cam system 95 which controls the film moving means 96 and which may be of any usual or preferred form.

The film is to be moved opposite the aperture 51, which is indicated as formed in a cooling jacket 98. Interposed between the aperture 51 and the source of light is provided a fire shutter 99 with which is associated a secondary cooling jacket 100. 101 indicates the shutter of the projector which may be of any desired type and which is indicated as driven by the stub shaft 92, which stub shaft 92 is indicated as being associated with a governor mechanism 102 controlling the fire shutter 99.

While the particular form of projector herein described is well adapted to carry out the objects of the present invention, it is to be understood that various modifications and changes may be made without departing from the principles of the present invention, and the present invention includes all such modifications and changes as come within the scope of the appended claims.

We claim:

1. A background projector including a base member, a projector head mounted by said base member and containing film and shutter moving mechanism driven by an electric motor, an electric distributor connected with said electric motor for driving the same synchronously with respect to the speed of said distributor, a constant speed motor for driving said distributor within said base, gear means connecting said latter motor and distributor including a plurality of spur gears in spaced relation, idler gears slidably mounted for selective contact with said spur gears, a shifting lever for moving said idler gear for establishing various speed changes between said latter motor and distributor, means for latching said lever in each of its various speed control positions, and means associated with said lever for indicating the speed of the film and shutter moving mechanism established by the positions of said lever.

2. A background projector comprising a projector head and a film shutter actuating mechanism, a motor for driving the same, an electric distributor for synchronously controlling the speed of said motor, a motor for driving said distributor, the drive connection between said motor and distributor including a speed shifting mechanism including a plurality of spur gears, an axially shiftable gear driving an idler gear, the same being shiftable to connect said idler gear with any one of said spur gears, lever means for effecting the aforesaid shifting movement, means for latching said lever in various controlled positions, and means associated with said lever for indicating the speed of the film and shutter moving mechanism established by the positions of said lever.

3. A background projector, comprising a base casing, a projector head mounted by said base casing and containing a film and shutter actuating mechanism and a motor for driving the same, an electric distributor disposed within said casing and connected with said motor for driving the same synchronously with respect to the speed of said distributor, a constant speed motor within said casing for driving said distributor, and selective speed change mechanism within said casing including a plurality of spur gears in spaced relation, idler gears slidably mounted for selective contact with said spur gears, a shiftable lever for moving said idler gears for establishing speed changes between said latter motor and said distributor, said lever extending through said casing, and said casing being provided with means for latching said lever in its various positions and provided with indicia of the resultng established shutter speed.

4. A background projector, comprising a base casing, a projector head mounted by said base casing and containing a film and shutter actuating mechanism and a motor for driving the same, an electric distributor disposed within said casing and connected with said motor for driving the same synchronously with respect to the speed of said distributor, a constant speed motor within said casing for driving said distributor, and selective speed change mechanism within said casing including a plurality of spur gears in spaced relation, idler gears slidably mounted for selective contact with said spur gears, a shiftable lever for moving said idler gears for establishing speed changes between said latter motor and said distributor, said lever extending through said casing, and said casing being provided with means for latching said lever in its various positions and provided with indicia of the resulting established shutter speed, said head including means for manually moving the shutter actuating mechanism, and said mechanism including a dummy shutter visible for indicating the position of said mechanism.

ALBERT ARNOLD GILLESPIE.
FRED HAUSER.
ANTHONY G. WISE.